United States Patent [19]

Honda et al.

[11] Patent Number: 4,987,544

[45] Date of Patent: Jan. 22, 1991

[54] ENGINE CONTROL DEVICE FOR REDUCING THE PROCESSING TIME OF CONTROL VARIABLES

[75] Inventors: Satoshi Honda, Shiki; Sumitaka Ogawa, Oomiya; Tatsuo Hayasi, Kawagoe, all of Japan

[73] Assignee: Honda Giken Kogyo Kabushiki Kaisha, Tokyo, Japan

[21] Appl. No.: 409,422

[22] Filed: Sep. 19, 1989

[30] Foreign Application Priority Data

Sep. 19, 1988 [JP] Japan ................................ 63-234216

[51] Int. Cl.[5] ...................... G06F 15/48; G06F 15/50; F02M 51/00

[52] U.S. Cl. ................................ 364/431.05; 123/486

[58] Field of Search ...................... 364/431.05, 431.04, 364/431.12, 431.01; 123/480, 486

[56] References Cited

U.S. PATENT DOCUMENTS

| | | | |
|---|---|---|---|
| 3,862,404 | 1/1975 | Fiedrich | 364/431.05 X |
| 4,036,190 | 7/1977 | Bigliani . | |
| 4,048,965 | 9/1977 | Bianchi et al. | 123/486 |
| 4,081,995 | 4/1978 | Griffith et al. . | |
| 4,352,158 | 9/1982 | Date et al. | 123/486 X |
| 4,445,483 | 5/1984 | Hasegawa | 123/480 X |
| 4,733,357 | 3/1988 | Abe | 364/431.04 |

FOREIGN PATENT DOCUMENTS 6318017 4/1988 Japan .

*Primary Examiner*—Parshotam S. Lall

*Assistant Examiner*—Edward Pipala

[57] ABSTRACT

An engine control device is provided for reducing the retrieving time of control data from sensors at high and low engine speeds. Control parameters from the sensors are converted into memory access parameters to a control map to recover the desired injection amount. The fuel injection quantity is calculated by retrieving fuel injection amounts using the memory access parameters as addresses and performing a four-point interpolation of the memory parameters. A previously retrieved value is used as a reference value to aid the determination of an updated memory access parameter so that the retrieving time can be reduced for high and low engine speeds.

22 Claims, 7 Drawing Sheets

| | Ne (0) | Ne (1) | Ne (2) | -------- | Ne (15) |
|---|---|---|---|---|---|
| Pb (0) | Mp (0.0) | Mp (1.0) | Mp (2.0) | -------- | Mp (15.0) |
| Pb (1) | Mp (0.1) | Mp (1.1) | Mp (2.1) | -------- | ¦ |
| Pb (2) | Mp (0.2) | Mp (1.2) | Mp (2.2) | | ¦ |
| ¦ | ¦ | ¦ | ¦ | | ¦ |
| Pb (15) | Mp (0.15) | ----- | ----- | -------- | Mp (15.15) |

ENGINE CONTROL DEVICE FOR REDUCING THE PROCESSING TIME OF CONTROL VARIABLES

BACKGROUND OF THE INVENTION

1. Field of the Invention

The present invention relates to an engine control device, and more particularly to an engine control device which can retrieve data in a short amount of time and reduce the time required for execution of various operations.

2. Description of the Background Art

In order to improve the output, fuel economy, exhaust gas purification, etc. of an automotive engine, the proper control of the air-fuel ratio, the ignition timing, the exhaust gas recirculation, etc. which influence the combustion of the engine are required.

In a conventional engine control system, output data from various sensors is input as digital signals to an electronic control device, and preliminary data that has been stored in the device is retrieved as digital signals in response to the introduced digital signals. Then, the preliminary data that corresponds to the detected digital signals is read out, and various actuators are controlled in response to the signal that is read out.

An example of a retrieving method for a conventional engine control system is disclosed in Japanese Pat. Publication No. 63-18017. In this publication, the retrieving time of the data is based on a maximum value of the engine speed or the load. Accordingly, as the engine speed or the load increases, the retrieving time for retrieving data decreases. The retrieval time is thereby reduced for executing of various operations based on the engine speed or the load.

The retrieving method described above has the following problem. When an electronic fuel injection device is controlled which requires a table retrieval at every given crank angle, for example, the retrieving method described above is advantageous at high engine speeds since the retrieving operation is preferentially conducted in response to the high engine speeds, and the retrieving time is reduced. However, when the engine speed is low, the retrieving time is increased. Accordingly, many kinds of arithmetic operations cannot be executed in the same amount of time.

In contrast, if the engine speeds are retrieved from a low value thereof, the retrieving time at high engine speeds cannot be reduced. Because it is normally desirable to reduce the retrieving time at high engine speeds, such a long retrieving time of the low engine speeds is disadvantageous.

SUMMARY OF THE INVENTION

An object of the present invention is to provide an engine control device for reducing the retrieval time of an engine control device for engines operating at high and low speeds.

In the present invention, data is retrieved by using a previously retrieved value as a reference value for the current retrieving operation. As a result, the retrieving time can be reduced for engines operating at high and low speeds.

In the preferred embodiment, a conventional microcomputer is connected to an engine speed sensor, an intake manifold vacuum sensor and a throttle valve opening sensor. A plurality of injectors correspond to each cylinder of the engine and are connected to the microcomputer by a driving circuit.

Control parameters from the various sensors are read and a fuel injection quantity for each injector is retrieved. A plurality of value ranges for each control parameter are preliminarily stored as a plurality of memory access parameters and are used to address a map in order to calculate fuel injection quantities. The fuel injection quantity is calculated by a four-point interpolation from injection amounts determined from the memory map using the memory access parameters as addresses. Accordingly, a great amount of processing can be executed irrespective of engine speed by reducing the retrieving time for high and low engine speeds.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

A preferred embodiment of the present invention will be described hereinbelow with reference to the drawings for the case of deciding a fuel injection quantity in an electronic fuel injection device (injector).

Figures 2, 4:
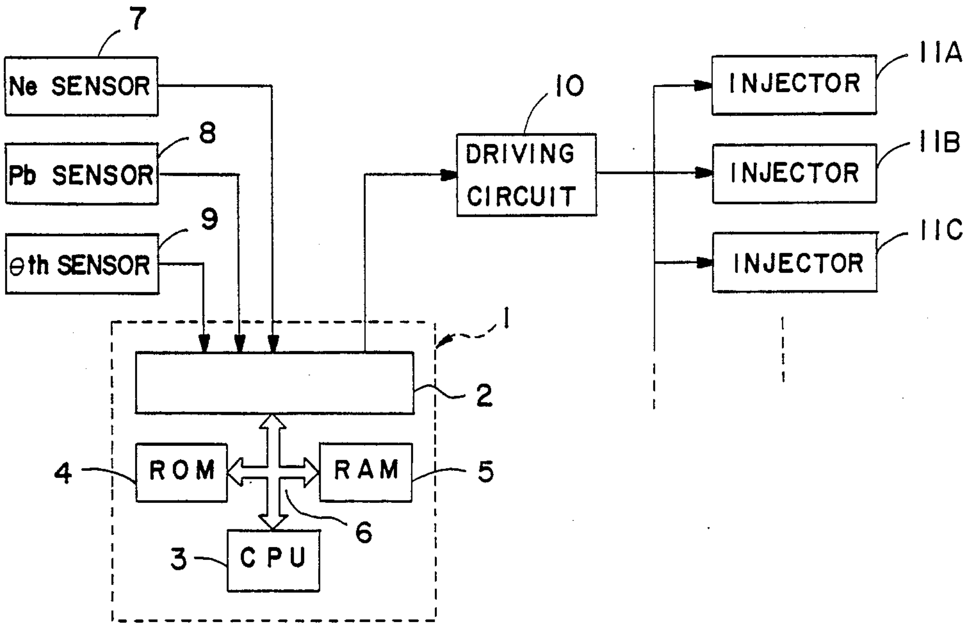
FIG. 2 is a block diagram of the hardware used in a preferred embodiment of the present invention.
FIG. 4 is an exemplary diagram of the map for storing the fuel injection quantities by using the engine speed Ne and the intake manifold vacuum Pb as the parameters as performed in step S2 of FIG. 3.

As used herein, a control parameter is a sensed value which is measured and used, at least in part, to control the fuel injection amount. A memory map or look up table FIG. 4 is used to determine a fuel injection amount based on the sensed control parameters. The sensed value of the control parameter is not, however, directly used to access the fuel injection amount from the memory map or look up table. Instead, each measured value of the control parameter is used to select a memory access parameter having a range within which the measured value falls. This memory access parameter is then used to address the memory map. Each memory access parameter therefore corresponds to a range of sensed values of a control parameter. Each control parameter may have sensed values which correspond to more than one memory access parameter. In other words, different possible values of a control parameter, for example manifold pressure, Pb, may fall within the range of sensed value represented by different memory access parameters Pb(0) to Pb(n) which are used as addresses for the look-up table or memory map. Each of the memory access parameters represents a range of values of a sensed parameter but in fact has a value equivalent to a single sensed value of the control parameter.

In FIG. 2, a block diagram of the preferred embodiment is shown having a microcomputer 1 which includes an input/output interface 2, a CPU 3, a ROM 4, a RAM 5, and a common bus 6 for connecting these elements together as is well known in the art.

The microcomputer 1 is connected to an engine speed Ne sensor 7 which detects an engine speed Ne (hereinafter referred to as "Ne sensor" 7), an intake manifold vacuum Pb sensor 8 which detects an intake manifold vacuum Pb (hereinafter referred to as "Pb sensor" 8), and a throttle valve opening θ th sensor 9 (hereinafter referred to as "θ th sensor" 9).

A plurality of injectors (three injectors 11A, 11B, and 11C are shown, for example in FIG. 2) are provided so that each injector is associated with one cylinder of an engine. The injectors are connected to a driving circuit 10, and the driving circuit 10 is connected to the microcomputer 1.

Figure 3:
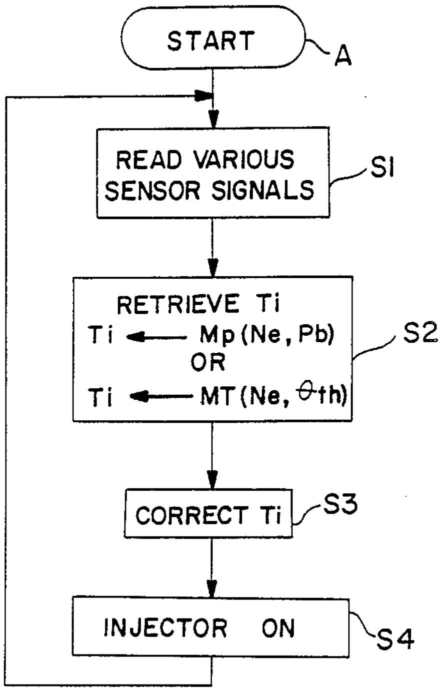
FIG. 3 is a flowchart for the schematic operation of the preferred embodiment.

In FIG. 3, a flowchart for the schematic operation of one preferred embodiment is shown. Control parameters output from the various sensors (Ne sensor 7, Pb sensor 8, θ th sensor 9, etc.) are first read in step S1. Then, a fuel injection quantity Ti of each injector (i.e., a current supply time of each injector) is retrieved in step S2. The fuel injection quantity Ti is preliminarily stored in a map (FIG. 4) as one or more stored values. The memory access parameters used as address parameters for the memory map may relate to the control parameters, engine speed Ne and intake manifold vacuum Pb or engine speed Ne and throttle valve opening θ th.

In the case when the measured value of a control parameter such as the engine speed Ne, the intake manifold vacuum Pb or the throttle valve opening θ th is not equal to an input value or memory access parameter used to address the memory map, the memory access parameters having the value nearest to the value of the measured control parameters for the engine speed Ne, the intake manifold vacuum Pb or the throttle valve opening θ th is used to access the memory map. Thereby, a fuel injection quantity is calculated by a four-point interpolation of this measurement data after conversion into memory access parameters. After retrieving the fuel injection quantity Ti for each combination of memory access parameters, the quantity Ti is corrected in step S3 for providing a final fuel injection quantity. Because the correction of the fuel injection quantity Ti is known in the art, an explanation of this correction will be omitted. The processing of step S3 may be omitted if desired.

In step S4, each injector is driven to supply a final fuel injection quantity in order to inject fuel. Thereafter, the program returns to step S1.

FIG. 4 shows an exemplary diagram of the map which stores the fuel injection quantity as function of the memory access parameters representing engine speed Ne and intake manifold vacuum Pb. Referring to the example of FIG. 4, Mp(0,0) denotes a fuel injection quantity corresponding to an engine speed Ne(0) and an intake manifold vacuum Pb(0). In this example of the map, 16 segment numbers from 0–15 are provided for each sensed parameter including engine speed Ne and intake manifold vacuum Pb, respectively. In other words, 16 memory access parameters Ne(0)–Ne(15) are provided for the engine speed Ne, and 16 memory access parameters Pb(0)–Pb(15) are provided for the intake manifold vacuum Pb.

In the case when the value of the control parameter for the engine speed Ne is present between the values of two memory access parameters Ne(m) and Ne(m+1), and the value of the control parameter for the intake manifold vacuum Pb is present between the values of two memory access parameters Pb(n) and Pb(n+1), the fuel injection quantities Mp(m,n), Mp(m+1,n), Mp(m,n+1) and Mp(m+1,n+1) which are mapped from the memory access parameters Ne(m), Ne(m+1), and Pb(n), Pb(n+1) are retrieved. A fuel injection quantity is then calculated by a four-point interpolation from the injection values established by use of these memory access parameters. For example, when the engine speed Ne is present between the values of the memory access parameters Ne(1) and Ne(2), and the intake manifold vacuum Pb is present between the values of the memory access parameters Pb(1) and Pb(2), the fuel injection quantities Mp(1,1), Mp(2,1), Mp(1,2), and Mp(2,2) are retrieved, and a fuel injection quantity is calculated by a four-point interpolation with the use of the values addressed by these memory access parameters.

Figure 5:
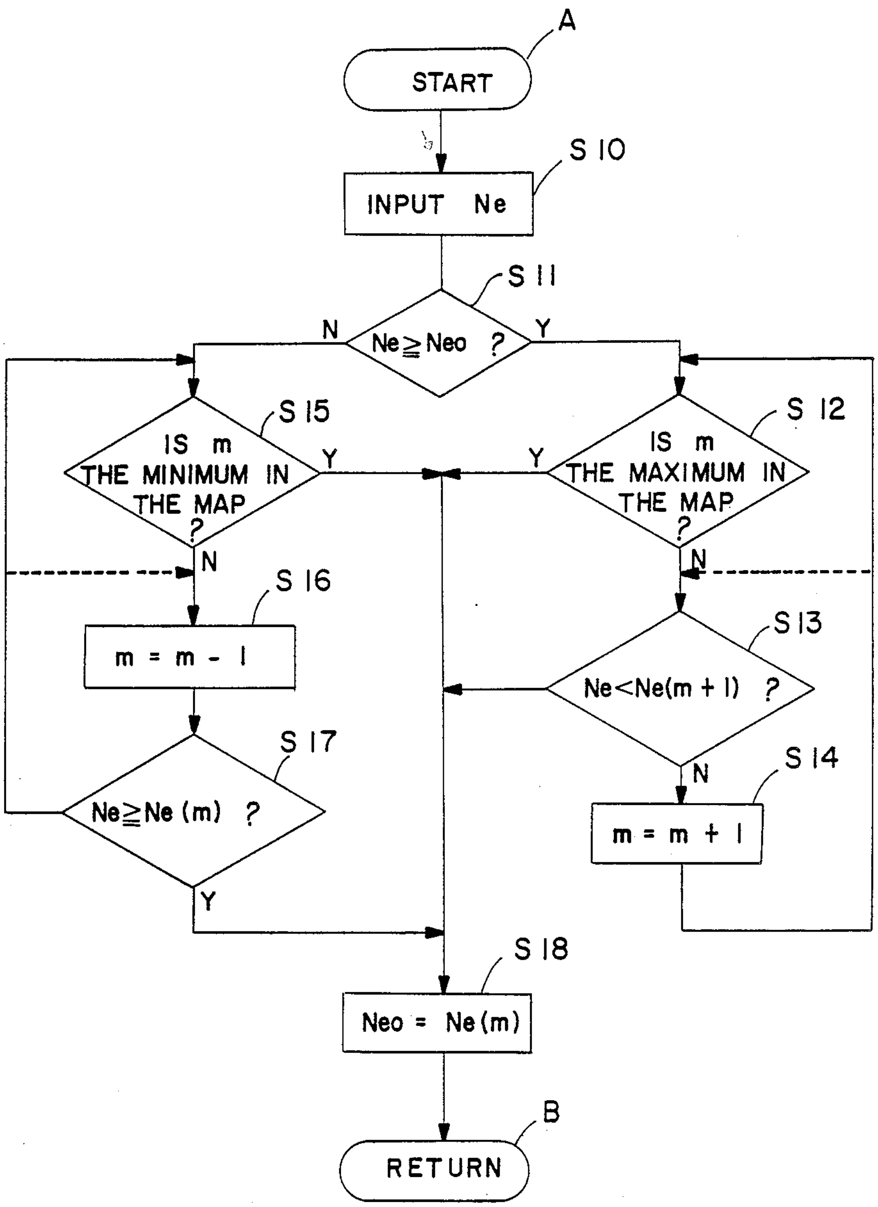
FIG. 5 is a flowchart of the retrieving method for the segment number m of the engine speed Ne.

In FIG. 5, a flowchart of a retrieving method for the segment number m of the engine speed Ne is shown. The engine speed Ne is first input in step S10 as the control parameter to be detected by the Ne sensor 7. Then step S11 determines whether or not the engine speed Ne is greater than or equal to the value Neo which is set at step S18 from the previous execution of this program.

If the engine speed Ne is greater than or equal to Neo, step S12 determines whether or not the segment number m, which is retrieved from the previous execution, is the maximum value in the map. If the segment number m is the maximum value in the map, the segment number m is determined as a segment number to be retrieved. Next, the memory access parameter Ne(m) is set to Neo in step S18 and the program ends.

If step S12 determines that the segment number m is not the maximum value in the map, the program proceeds to step S13 where it is determined whether or not the engine speed Ne is less than the value of the memory access parameter Ne(m+1). If the engine speed Ne is less than the value of the memory access parameter Ne(m+1), the segment number m is determined as the segment number to be retrieved. Next, the memory access parameter Ne(m) is set to Neo in step S18 and the program ends.

If step S13 determines that the engine speed Ne is not less than the value of memory access parameter Ne(m+1), the program proceeds to step S14 where the segment number m is incremented by 1, and the program returns to step S12.

If step S11 determines that the engine speed Ne is less than Neo, the program proceeds to step S15 where it is determined whether or not the segment number m which is retrieved from the previous execution is the minimum value in the map. If the segment number m is the minimum value in the map, the segment number m is determined as a segment number to be retrieved. Next, the program proceeds to step S18 where the value of the memory access parameter Ne(m) is set to Neo and the program ends.

If step S15 determines that the segment number m is not the minimum value in the map, the program proceeds to step S16 where the segment number m is decremented by 1. Subsequently, step S17 determines whether or not the engine speed Ne is greater than or equal to the value of the memory access parameter Ne(m). If the engine speed Ne is greater than or equal to the value of the memory parameter Ne(m), the segment number m is determined as a segment number to be retrieved. Next the memory access parameter Ne(m) is set to Neo in step S18 and the program ends. If step S17 determines that the engine speed Ne is less than Ne(m), the program returns to step S15.

Figure 6:
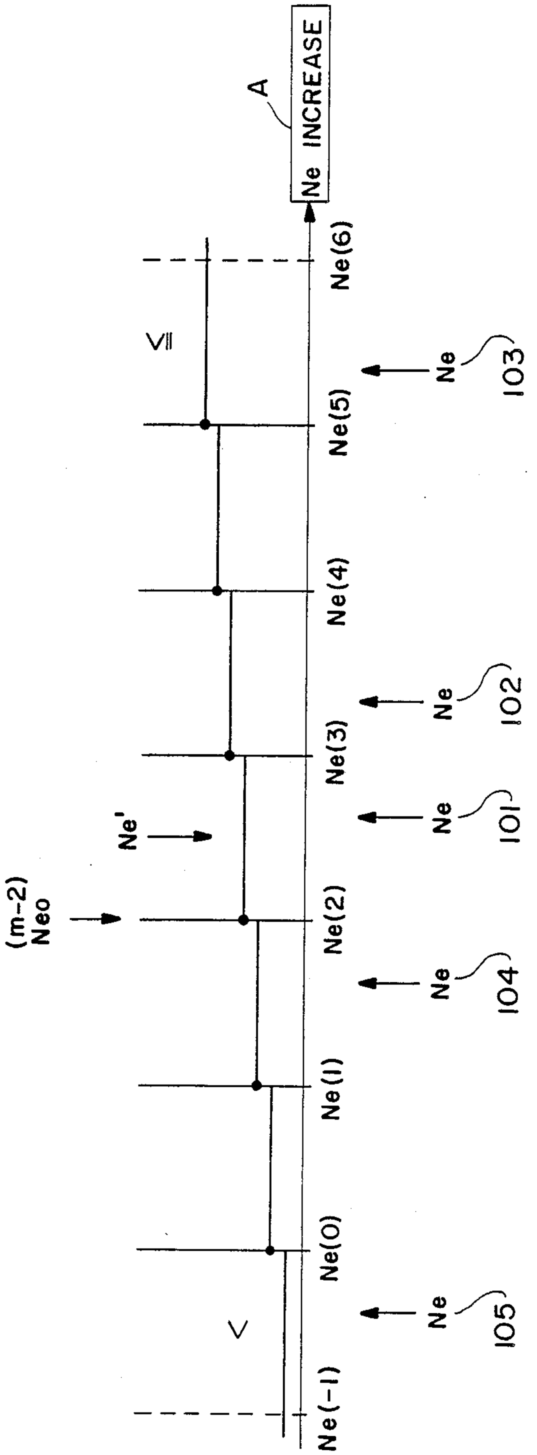
FIG. 6 is a graph for explaining the retrieval method as shown in FIG. 5.

In FIG. 6, a graph is shown for explaining the retrieving method shown of FIG. 5. A horizontal axis represents the engine speed, that is, the six memory access parameters Ne(0)–Ne(5) that are present in this map. Furthermore, if the value of the engine speed control parameter Ne is on the heavy lines, the value for this memory access parameter shown at a left end of each heavy line as a dot is retrieved. For example, if a value of Ne' is to be input as the engine speed Ne and is present between the values of memory access parameter Ne(2) and Ne(3), the memory parameter Ne(2) is set to Neo, and the segment number m is set at 2.

Figure 7:
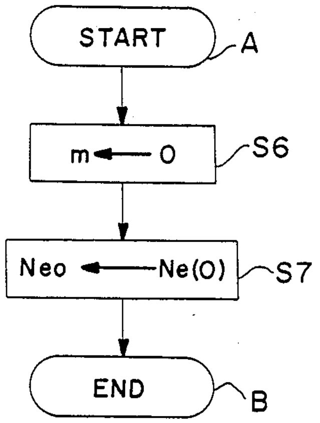
FIG. 7 is a flowchart of the initializing routine for the segment number m and the reference value Neo.

FIG. 7 shows a flowchart of an initializing routine for the segment number m and the reference value Neo. The initialization routine begins after turning on a start switch of the vehicle and the program of FIG. 7 is executed before the program of FIG. 5. As shown in FIG. 7, the segment number m is first set to 0 in step S6, and the reference value Neo is then set to Ne(0) in step S7.

In FIG. 6, reference numerals 101–105 denote different numeral data to be input as the engine speed Ne in step S10. Each case for inputting one of the numeral data 101–105 will be described in the following paragraphs.

(1) The first case to be described is when the numeral data 101 is to be input as the engine speed Ne.

In the case when the numeral data 101 that is input for the engine speed Ne is between the memory access parameters Ne(2) and Ne(3), the engine speed Ne, which is the control parameter, is greater than the reference value Neo equal to Ne(2). Accordingly, the program of FIG. 5 proceeds from step S11 to step S12. Since the segment number m is equal to 2 and is not the maximum value in the map, the program proceeds from step S12 to step S13. In step S13, the engine speed Ne is compared with the memory access parameter Ne(3). Since the engine speed Ne is less than Ne(3), the program proceeds from step S13 to step S18 where Ne(2) is set to Neo and the program ends. Thus, the segment number m does not change and remains at 2.

(2) The second case to be described is when the numeral data 102 is to be input as the engine speed Ne.

In the case when the numeral data 102 that is input for the engine speed Ne is between the memory access parameters Ne(3) and Ne(4), the engine speed Ne is greater than the reference value Neo that is equal to Ne(2). Accordingly, the program of FIG. 5 proceeds from step S11 to step S12. Since the segment number m is equal to 2 and is not the maximum value in the map, the program proceeds from step S12 to step S13. In step S13, the engine speed Ne is compared with the memory access parameter Ne(3). Since the engine speed Ne is greater than Ne(3), the program proceeds from step S13 to step S14 and the segment number m is incremented by 1. Then, the program returns to step S12. Since the segment number m is currently equal to 3 and is not the maximum value in the map, the program proceeds again from step S12 to step S13 where the engine speed Ne is compared with the memory access parameter Ne(4). Since the engine speed Ne that is designated by the reference numeral 102 is less than Ne(4), the program proceeds from step S13 to step S18 where Ne(3) is set to Neo and the program ends. Thus, the segment number m changes from 2 to 3.

(3) The third case to be described is when the numeral data 103 is to be input as the engine speed Ne.

In the case when the numeral data 103 that is input for the engine speed Ne is greater than or equal to the memory access parameter Ne(5), the engine speed Ne is greater than the reference value Neo which is equal to Ne(2). Accordingly, the program of FIG. 5 proceeds from step S11 to step S12. Since the segment number m is equal to 2 and is not the maximum value in the map, the program proceeds from step S12 to step S13. Then, the processes of steps S13, S14, and S12 are sequentially repeated. When the segment number m is set to 5 in step S14, step S12 determines that the segment number m is the maximum value in the map. The program proceeds to step S18 where Ne(5) is set to Neo and the program ends. Thus, the segment number m changes from 2 to 5.

(4) The fourth case to be described is when the numeral data 104 is to be input as the engine speed Ne.

In the case when the numeral data 104 that is input for the engine speed Ne is between the memory access parameters Ne(1) and Ne(2), the engine speed Ne is less than the reference value Neo that is equal to Ne(2). Accordingly, the program of FIG. 5 proceeds from step S11 to step S15. Since the segment number m is equal to 2 and is not the minimum value in the map, the program proceeds from step S15 to step S16 where the segment number m is decremented by 1. In step S17, the engine speed Ne is compared with the memory access parameter Ne(1). Since the engine speed Ne that is designated by the reference numeral 104 is greater than Ne(1), the program proceeds from step S17 to step S18 where Ne(1) is set to Neo and the program ends. Thus, the segment number m changes from 2 to 10.

(5) The fifth case to be described is when the numeral data 105 is to be input as the engine speed Ne.

In the case when the numeral data 105 that is input for the engine speed Ne is less than the memory access parameter Ne(0), the engine speed Ne is less than the reference value Neo which is equal to Ne(2). Accordingly, the program of FIG. 5 proceeds from step S11 to step S15. Since the segment number m is equal to 2 and is not the maximum value in the map, the program proceeds from step S15 to step S16. Then, the processes of steps S16, S17, and S15 are sequentially repeated. When the segment number m is set to 0 in step S16, step S15 determines that the segment number m is the minimum value in the map. The program proceeds to step S18 where Ne(0) is set to Neo and the program ends. Thus, the segment number m changes from 2 to 0.

In the above description, the control parameter (i.e., the engine speed Ne) is assumed to include numeral data as designated by the numeral 103 which is greater than the maximum value of the memory access parameters and numeral data as designated by the numeral 105 which is less than the minimum value of the memory access parameters. Accordingly, it is necessary for the program to return from step S14 to step S12 or from step S17 to step S15, so that the program ends. If the engine speed Ne is greater than the maximum value or less than the minimum value, the program should return to step S12 or step S15 because Ne(6) and Ne(−1) are not present in the map.

However, the map may be formed in such a manner that the engine speed Ne is always present as the control parameter within the range between the maximum value and the minimum value of the memory parameters. In the above-mentioned example, the map may be formed in a manner such that the actual engine speed Ne is always within the range between Ne(0) and Ne(5). In other words, the map may be formed in such a manner that the engine speed Ne does not become greater than the maximum value or less than the minimum value. In this case, the program of FIG. 5 proceeds to step S13 or step S16 after processing step S14 or step S17, respectively, as shown by the broken lines. Accordingly, the retrieving operation of the segment number can be carried out more quickly.

Furthermore, steps S12 and S15 may be omitted in this case. That is, the program may proceed from step S11 directly to step S13 or step S16. The processing of step S18 may be omitted, and the comparison between the engine speed Ne and the memory access parameter Ne(m) may be executed in step S11.

The additional processing of step S14 may be carried out between step S12 and step S13, and step S13 may determine whether or not the engine speed Ne is less than Ne(m). In this case, if the engine speed Ne is determined to be not less than Ne(m), the program returns to the S12. If the engine speed Ne is determined to be less than Ne(m), the segment number m is decremented by 1 and the program proceeds to step S18.

Similarly, the subtraction processing of step S16 may be carried out after step S17 but before step S15, and step S17 may determine whether or not the engine speed Ne is greater than or equal to Ne(m−1). In this case, if the engine speed Ne is determined to be greater than or equal to Ne(m−1), the segment number m is decremented by 1 and the program proceeds to step S18.

After the retrieving operation for the segment number m of the engine speed Ne ends, a segment number n of the intake manifold vacuum Pb is then retrieved. After retrieving the segment number n of the intake manifold vacuum Pb, the fuel injection quantities Mp(m,n), Mp(m+1,n), Mp(m,n+1) and Mp(m+1,n+1) are read from the map by using the segment number m, m+1, n, and n+1, that is, the memory access parameters Ne(m), Ne(m+1), Pb(n), and Pb(n+1). By using these values, the fuel injection quantity Ti, which corresponds to the actual engine speed Ne and the actual intake manifold vacuum Pb, is calculated by a four-point interpolation.

The method of the four-point interpolation will be briefly described with reference to FIG. 8.

Figure 8:
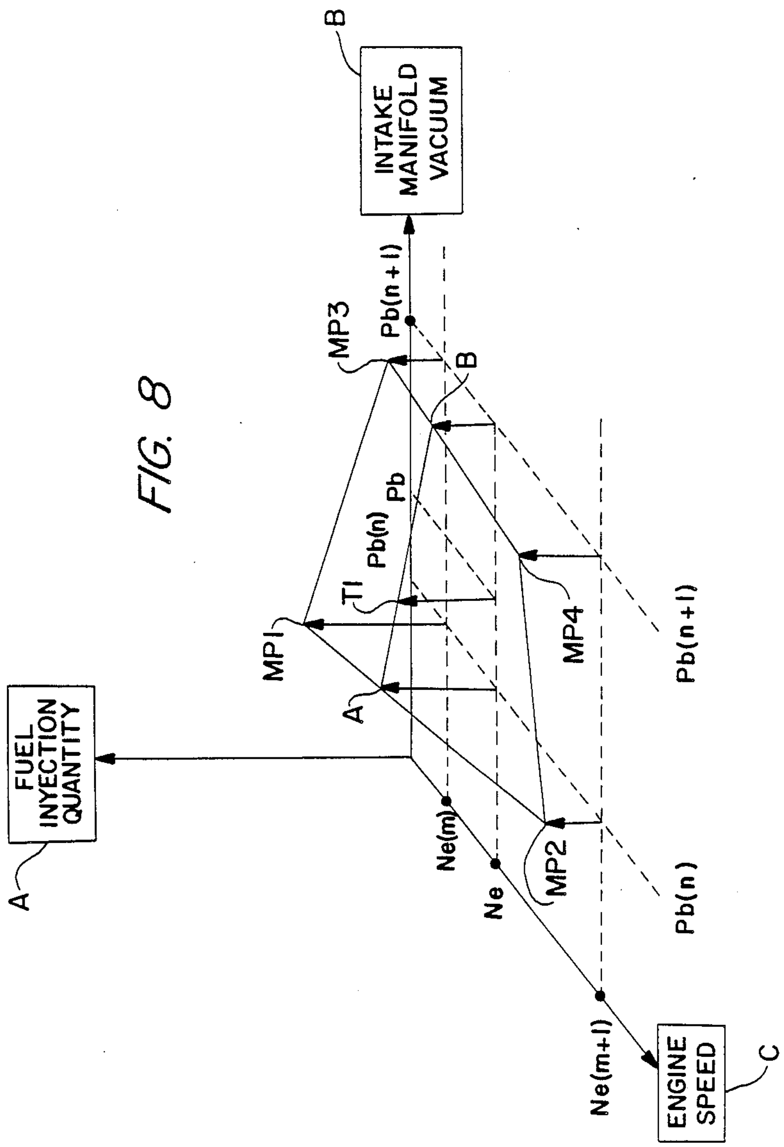
FIG. 8 is a graph for explaining the four-point interpolation calculation.

In FIG. 8, it is assumed that the segment numbers m, m+1, n, n+1 are retrieved, and the fuel injection quantities Mp(m,n)=MP1, Mp(m+1)n=MP2, Mp(m,n+1)=MP3, and Mp(m+1,n+1)=MP4 are set corresponding to the above data.

(1) In a first step, a first point A is obtained for internally dividing a line segment which connects the quantities MP1 and MP2 having a ratio of (Ne− Ne(m)):(Ne(m+1)−Ne).

(2) In a second step, a second point B is obtained for internally dividing a line segment which connects the quantities MP3 and MP4 having a ratio of (Ne−Ne(m)):(Ne(m+1)−Ne).

(3) In a third step, a third point for internally dividing a line segment which connects the first point A and the second point B having a ratio of (Pb−Pb(n)):(Pb(n+1)−Pb). The third point designates the fuel injection quantity Ti which corresponds to the actual engine speed Ne and the actual intake manifold vacuum Pb.

In a modification for the above described process, the first step and the second step may be modified so that a first internal dividing point is obtained on a line segment which connects MP1 and MP3, and a second internal dividing point is obtained on a line segment which connects MP2 and MP4 where both line segments have a ratio of (Pb−Pb(n)):(Pb(n+1)−Pb). In this case, the third step is modified to obtain a third internal dividing point on a line segment which connects the first and second internal dividing points having a ratio of (Ne−-Ne(m)):(Ne(m+1)−Ne).

Figure 9:
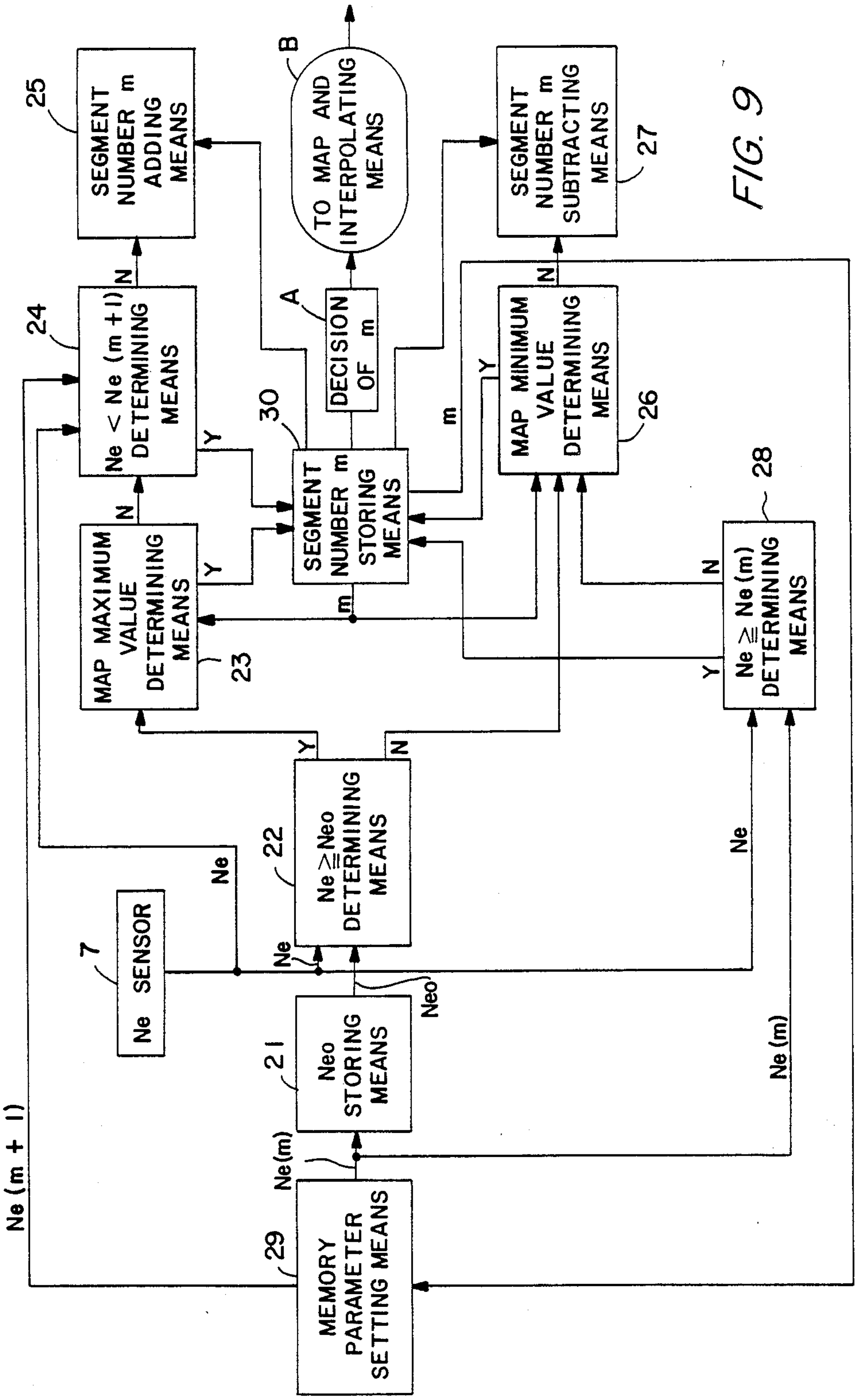
FIG. 9 is a functional block diagram of the system of the preferred embodiment.

FIG. 9 shows a functional block diagram of the preferred embodiments. The Ne sensor 7 and Neo storing means 21 are connected to Ne Neo determining means 22 which determines whether or not the engine speed Ne that is output from the Ne sensor 7 is greater than or equal to the reference value Neo that is output from the Neo storing means 21. If the engine speed Ne is greater than or equal to Neo, map maximum value determining means 23 is enabled.

The map maximum value determining means 23 determines whether or not the segment number m stored in segment number m storing means 30 is the maximum value in the map. If the segment number m is the maximum value, the segment number m is directly output to the map and four-point interpolation calculating means.

If the segment number m is not the maximum value, an Ne<Ne(m+1) determining means 24 is energized. The Ne< Ne(m+1) determining means 24 determines whether or not the engine speed Ne that is output from the Ne sensor 7 is less than the value for Ne(m+1) that this output from the memory parameter setting means 29 which will be hereinafter described.

If the engine speed Ne is less than the value for Ne(m+1), the segment number m is directly output to the map and the four-point interpolation calculating means. If the engine speed Ne is not less than the value for Ne(m+1), segment number m adding means 25 increments the segment number m by 1. The sum for (m+1) is updated to m and is stored into the segment number m storing means 30. Then, the map maximum value determining means 23 is energized again by using the updated segment number m.

If the updated segment number m is not the maximum value in the map, the Ne<Ne(m+1) determining means 24 is energized again to determine whether or not the memory access parameter Ne(m+1) is set by the memory parameter setting means 29 according to the segment number m that this currently stored in the segment number m storing means 30.

If the Ne≧Neo determining means 22 determines that the engine speed Ne is greater than or equal to Neo, the map maximum value determining means 23 and the Ne< Ne(m+1) determining means 24 are sequentially energized. If the results from the determining means 23 and 24 are both NO, the segment number m adding is energized, and the determining means 23 and 24 are energized again. In this manner, the determining means 23 and 24 and the adding means 25 are sequentially energized in this order.

If the Ne≧Neo determining means 22 determines that the engine speed Ne is less than Neo, map minimum value determining means 26 is energized for determining whether or not the segment number m, which is stored in the segment number m storing means 30, is the minimum value in the map. If the segment number m is the minimum value, the segment number m is directly output to the map and the four-point interpolation calculating means.

If the segment number m is not the minimum value, the segment number m is decremented by 1 in segment number m subtracting means 27, and the difference (m−1) is updated to m which is stored into the segment number m storing means 30.

The updated segment number m is output from the segment number m storing means 30 to the memory parameter setting means 29. The memory parameter setting means 29 sets the memory access parameter Ne(m) according to the input segment number m, and outputs the memory access parameter Ne(m) that is newly set to the Neo storing means 21 and the Ne≧Ne(m) determining means 28.

The Ne≧Ne(m) determining means 28 determines whether or not the engine speed Ne that is output from the Ne sensor 7 is greater than or equal to the memory access parameter Ne(m) that is output from the memory parameter setting means 29. If the engine speed Ne is greater than or equal to Ne(m), the segment number m stored in the segment number m storing means 30 is directly output to the map and the four-point interpolation calculating means. If the engine speed Ne is less than Ne(m), the map minimum value determining means 26 is energized again and determines whether or not the segment number m storing means 30 is the minimum value in the map.

If the Ne≧Neo determining means 22 determines that the engine speed Ne is less than the reference value Neo, the map minimum value determining means 26 is energized. If the result of the determination in the map minimum value determining means 26 is NO, then the subtracting means 27 is energized, and the Ne≧Ne(m) determining means 28 is energized. If the result of the determination in the Ne≧Ne(m) determining means 28 is NO, the map minimum value determining means 26 is energized again. Thus, the map minimum value determining means 26, the Ne≧Ne(m) determining means 28 and the subtracting means 27 are sequentially energized in this order. The values Neo and m currently stored in the storing means 21 and 30, respectively, will be output in the next retrieving operation. At the start of the above-mentioned processing, 0 is stored in the segment number m storing means 30, and Ne(0) is stored in the Neo storing means 21.

Figure 1:
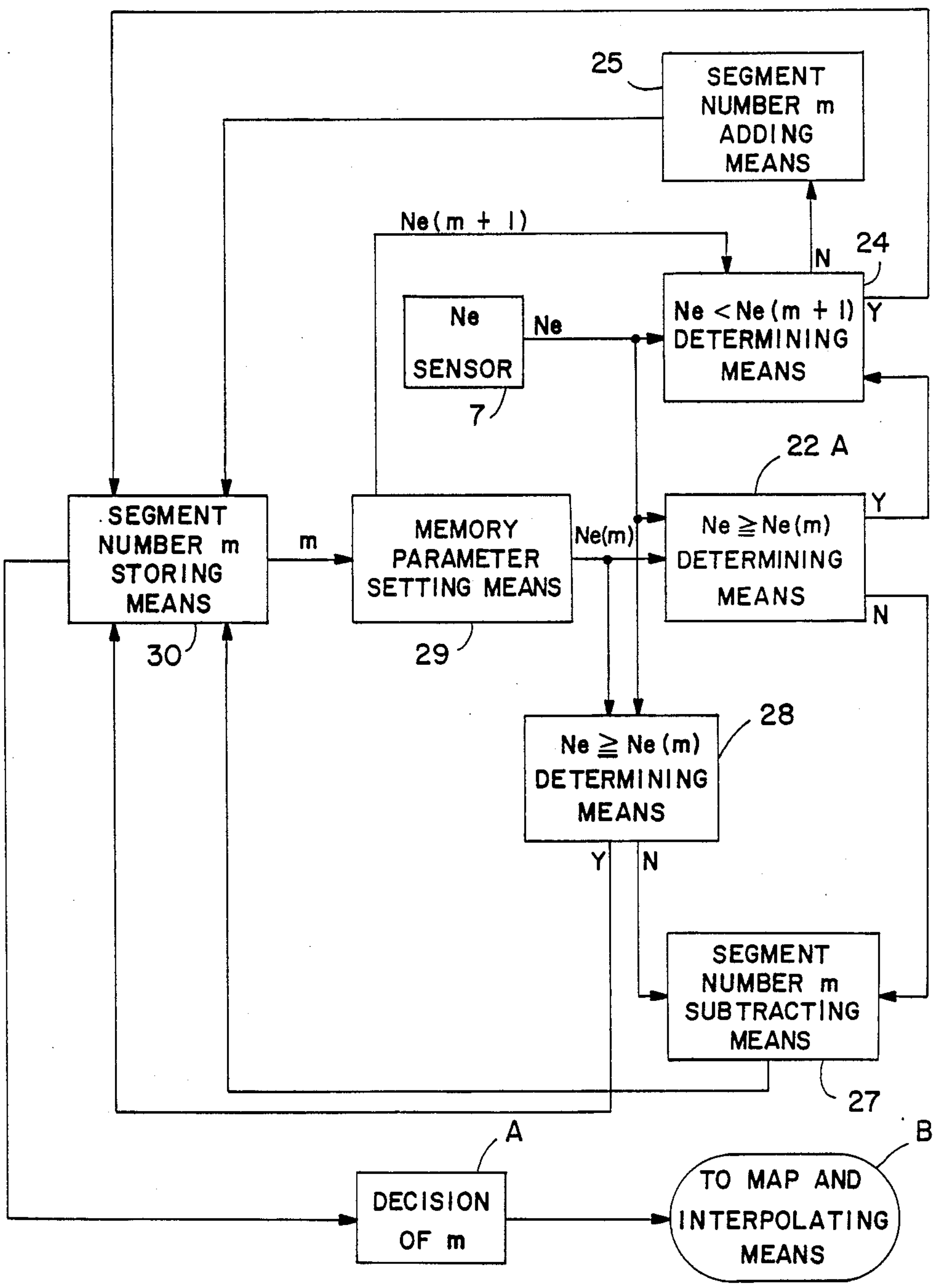
FIG. 1 is a functional block diagram for a modification of a preferred embodiment of the present invention.

In FIG. 1, a modification of FIG. 9 is shown wherein the same reference numerals designate the same or corresponding parts as those in FIG. 9. The Ne sensor 7 and the memory parameter setting means 29 are connected to Ne≧Ne(m) determining means 22A for determining whether or not the engine speed Ne that is output from the Ne sensor 7 is greater than or equal to Ne(m) that is output from the memory parameter setting means 29. If the engine speed Ne is greater than or equal to Ne(m), the Ne< Ne(m+1) determining means 24 is energized for determining whether or not the engine speed Ne is less than Ne(m+1) that is output from the memory parameter setting means 29. If the engine speed Ne is less than the value of Ne(m+1), the segment number m stored in the segment number m storing means 30 is output to the map and the four-point interpolation calculating means.

If the Ne<Ne(m+1) determining means 24 determines that the engine speed Ne is not less than Ne(m+1), the segment number m is incremented by 1 in the segment number m adding means 25, and the sum (m+1) is updated to m and stored into the segment number m storing means 30. Then, the updated segment number m is input to the memory parameter setting means 29 and the Ne<Ne(m+1) determining means 24 is energized again.

If the Ne≧Ne(m) determining means 22A determines that the engine speed Ne is less than Ne(m), the segment number m subtracting means 27 is energized and decrements the segment number m by 1. Then, the difference (m−1) is updated to m which is stored into the segment number m storing means 30.

Then, the memory access parameter Ne(m) is set by the memory parameter setting means 29 in response to the updated segment number m, and the Ne≧Ne(m) determining means 28 is energized for determining whether or not the engine speed Ne that is output from the Ne sensor 7 is greater than or equal to the memory access parameter Ne(m) that is output from the memory parameter setting means 29. If the engine speed Ne is greater than or equal to Ne(m), the segment number m storing means 30 is energized for outputting the segment number m that is currently stored in the segment number m storing means 30 to the map and the four-point interpolation calculating means. If the Ne≧Ne(m) determining means 28 determines that the engine speed Ne is less than Ne(m), the segment number m subtracting means 27 is energized again. In the same manner as the preferred embodiment that is described in FIG. 9, the segment number m=0 is stored in the segment number m storing means 30 at the start of the processing in FIG. 1.

Although the engine speed Ne is used as the control parameter in retrieving the map as mentioned above for setting the dual injection quantity of each injector, any data other than the engine speed Ne may be used as the control parameter for addressing the map to carry out engine control (e.g., ignition control) other than the fuel injection quantity control in embodiments of the present invention.

In the preferred embodiment, the means of FIGS. 1 and 9 may be implemented by the microprocessor having a flow chart performing the functions described in the means of these figures. Alternatively, these means may be implemented by hardwired circuitry which may be easily developed from the description presented hereinabove.

As described above, the present invention can provide the following effects. When the segment number previously retrieved is set to a reference value for retrieving the current segment number, the retrieving time can be reduced for engines operating at high and low speeds. Accordingly, if the microcomputer is conventional, a great amount of processing can be executed irrespective of the amplitude of the engine speed. In other words, if the processing is conventional, an inexpensive microcomputer can be used which is not necessary to have a high processing speed. When the vehicle is driven at a constant running speed, the retrieving time can be reduced even more. As a result, many different kinds of processings for the vehicle can be executed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling fuel injection in an engine comprising the steps of:

(a) sensing at least one engine operating condition to develop a sensed value of a control parameter;

(b) storing a control map having a plurality of fuel injection quantities which are addressed by a plurality of memory access parameters, each of said memory access parameters corresponding to adjacent ranges of possible values of said control parameters being defined by sequential segment numbers, each said memory access parameter having a segment value within the range of possible values of said control parameter defined thereby;

(c) selecting an initial memory access parameter defined by a segment number;

(d) comparing the sensed value of said control parameter to said range of values corresponding to said initial memory access parameter defined by said segment number and determining whether said sensed value is greater than, less than or within said range of values corresponding to said initial memory access parameter;

(e) selecting said initial memory access parameter as a selected memory access parameter to access said control map when said sensed value is within the range of values corresponding to said initial memory access parameter;

(f) updating said memory access parameter by incrementing or decrementing said segment number when said initial memory access parameter is determined in said step to be greater than or less than said range of values;

(g) repeating said steps (d)–(f) until said step (e) selects said initial memory access parameter as said selected memory access parameter;

(h) accessing a fuel injection quantity from said control map by addressing said map with said selected memory access parameter; and (i) injecting fuel of a quantity selected by said step (h) into said engine.

2. A method for controlling a plurality of fuel injectors as defined in claim 1, wherein said plurality of memory access parameters which address said control map comprise values greater than minimum values and less than maximum values of said plurality of control parameters.

3. A system of controlling fuel injection in an engine comprising:

sensor means for sensing at least one engine operating condition to develop a sensed value of a control parameter;

memory means for storing a control map having a plurality of fuel injection quantities which are addressed by a plurality of memory access parameters, each of said memory access parameters corresponding to adjacent ranges of possible values of said control parameter being defined by sequential segment numbers, each of said memory access parameters having a segment value within the range of possible values of said control parameter defined thereby;

means for selecting an initial memory access parameter defined by a segment number;

comparator means, responsive to said sensor means and said means for selecting, for comparing the sensed value of said control parameter to said range of values corresponding to said initial memory access parameter defined by said segment number and determining whether said sensed value is greater than, less than, or within said range of values corresponding to said initial memory access parameter;

address determination means, responsive to said comparator means, for selecting said initial memory access parameter as a selected memory access parameter to access said control map when said sensed value is within the range of values corresponding to said initial memory access parameter;

means for updating said initial memory access parameter, responsive to said comparator means, by incrementing or decrementing said segment number when said comparator means determines that said initial memory access parameter is greater than or less than said range of values;

said comparator means, said address determination means and said means for updating operating until said address determination means selects said initial memory access parameter as said selected memory access parameter;

retrieval means for accessing a fuel injection quantity from said control map in said memory means by addressing said map with said selected memory access parameter; and means for injecting fuel of a quantity selected by said control map into said engine.

4. A method for controlling a plurality of fuel injectors in an engine, comprising the steps of:

(a) sensing first and second control parameters which correspond to the engine operating conditions at an initial sensing time;

(b) storing a control map having a plurality of fuel injection quantities which are addressed by first and second memory access parameters, each of said first and second memory access parameters corresponding to adjacent ranges of possible values of said first and second control parameters being defined by sequential first and second segment numbers, respectively, each of said first and second memory access parameters having a segment value within the range of possible values of said first and second control parameters defined thereby;

(c) initializing first and second segment numbers at said initial sensing time;

(d) defining one of said first memory access parameters by said first segment number and one of said second memory access parameters by said second segment number;

(e) determining whether said one first memory access parameters is within a first predetermined interval of said first control parameter and whether said one second memory access parameter is within a second predetermined interval of said second control parameter;

(f) incrementing said first segment number when said first control parameter is greater than said first predetermined interval from said one first memory access parameter and incrementing said second segment number when said second control parameter is greater than said second predetermined interval from said one second memory access parameter;

(g) decrementing said first segment number when said first control parameter is less than said first predetermined interval from said one first memory access parameter and decrementing said second segment number when said second control parameter is less than said second predetermined interval from said one second memory access parameter;

(h) repeating steps (d)–(g) after said first segment number or said second segment number is incremented or decremented;

(i) storing first and second calculated segment numbers when both said first and second segment numbers fail to be incremented or decremented;

(j) retrieving four of said plurality of fuel injection quantities from said control map as addressed by combinations of said first and second memory access parameters, a first quantity being defined by said first and second calculated segments numbers, a second quantity being defined by said first and second calculated segment numbers incremented by one, a third quantity being defined by said first calculated segment number and said second calculated segment number incremented by one, and a fourth quantity being defined by said first calculated segment number incremented by one and said second calculated segment number;

(k) processing said four fuel injection quantities by a four point interpolation and developing a control signal therefrom;

(l) driving said plurality of fuel injectors by said control signal;

(m) sensing first and second control parameters which correspond to the engine operating conditions at a subsequent sensing time;

(n) retrieving one of said first memory access parameters as defined by said first calculated segment number and one of said second memory access parameters as defined by said second calculated segment number;

(o) determining whether said one first memory access parameter is within said first predetermined interval of said first control parameter and whether said one second memory access parameter is within said second predetermined interval of said second control parameter;

(p) incrementing said first calculated segment number when said first control parameter is greater than said first predetermined interval from said one first memory access parameter and incrementing said second calculated segment number when said second control parameter is greater than said second predetermined interval from said one second memory access parameter;

(g) decrementing said first calculated segment number when said first control parameter is less than said first predetermined interval from said one first memory access parameter and decrementing said second calculated segment number when said second control parameter is less than said second predetermined interval from said one second memory access parameter;

(r) repeating steps (n)–(q) after said first calculated segment number or said second calculated segment number is incremented or decremented;

(s) storing first and second subsequently calculated segment numbers when both said first and second calculated segment numbers fail to be incremented or decremented;

(t) retrieving four of said plurality of fuel injection quantities from said control map as addressed by combinations of said first and second memory access parameters, a first quantity being defined by said first and second subsequently calculated segment numbers, a second quantity being defined by said first and second subsequently calculated segment numbers incremented by one, a third quantity being defined by said first subsequently calculated segment number and said second subsequently calculated segment number incremented by one, and a fourth quantity being defined by said first subsequently calculated segment number incremented by one and said second subsequently calculated segment number;

(u) processing said four fuel injection quantities by a four point interpolation and developing a control signal therefrom;

(v) driving said plurality of fuel injectors by said control signal;

(w) repeating steps (m)–(v) while the engine continues to operate.

5. A method for controlling a plurality of fuel injectors as defined in claim 4 wherein said first and second control parameters sensed at steps (b) and (m) comprise an engine speed parameter and an intake manifold vacuum parameter.

6. A method for controlling a plurality of fuel injectors as defined in claim 4 wherein said first and second control parameters sensed at steps (b) and (m) comprise an engine speed parameter and a throttle valve opening parameter.

7. A method for controlling a plurality of fuel injectors as defined in claim 4 wherein said plurality of memory access parameters which address said control map comprise values greater than minimum values and less than maximum values of said first and second control parameters.

8. A method for controlling a plurality of fuel injectors in an engine, comprising the steps of:

(a) sensing a plurality of control parameters each of which correspond to the engine operating conditions at an initial sensing time;

(b) storing a control map having a plurality of fuel injection quantities which are addressed by a plurality of memory access parameters, each of said plurality of memory access parameters corresponding to adjacent ranges of possible values of said plurality of control parameters being defined by a sequential plurality of segment numbers, respectively, each of said plurality of memory access parameters having a segment value within the range of possible values of said plurality of control parameters defined thereby;

(c) initializing a plurality of segment numbers which correspond to said plurality of memory parameters at said initial sensing time;

(d) defining each of said plurality of memory access parameters by said plurality of segment numbers;

(e) determining whether each of said plurality of memory access parameters is within a predetermined interval of said plurality of control parameters corresponding thereto;

(f) incrementing each of said plurality of segment numbers when each of said plurality of control parameters corresponding thereto is greater than said predetermined interval from each of said plurality of memory access parameters corresponding thereto;

(g) decrementing each of said plurality of segment numbers when each of said plurality of control parameters corresponding thereto is less then said predetermined interval from each of said plurality of first memory access parameters corresponding thereto;

(h) repeating steps (d)-(g) when at least one of said plurality of segment numbers is incremented or decremented;

(i) storing a plurality of calculated segment numbers when all of said plurality of segment numbers fail to be incremented or decremented;

(j) retrieving said plurality of fuel injection quantities from said control map as addressed by said plurality of memory access parameters defined by combinations of said plurality of calculated segment numbers and each of said plurality of calculated segment numbers incremented by one;

(k) interpolating said plurality of fuel injection quantities from step (j) and developing a control signal therefrom;

(l) driving said plurality of fuel injectors by said control signals;

(m) sensing a plurality of control parameters which correspond to said plurality of memory access parameters and the engine operating conditions at a subsequent sensing time;

(n) retrieving each of said plurality of memory access parameters as defined by said plurality of calculated segment numbers;

(o) determining whether each of said plurality of memory access parameters defined by said plurality of calculated segment numbers are within said predetermined interval of said plurality of control parameter corresponding thereto;

(p) incrementing each of said plurality of calculated segment numbers when each of said plurality of control parameters corresponding thereto is greater than said predetermined interval from each of said plurality of memory access parameters corresponding thereto;

(q) decrementing each of said plurality of calculated segment numbers when each of said plurality of control parameters corresponding thereto is less than said predetermined interval from each of said plurality of memory access parameters corresponding thereto;

(r) repeating steps (n)-(q) when at least one of said plurality of calculated segment numbers is incrementing or decremented;

(s) storing a plurality of subsequently calculated segment numbers when of said plurality of calculated segment numbers fail to be incremented or decremented;

(t) retrieving said plurality of fuel injection quantities from said control map as addressed by said plurality of memory access parameters defined by combinations of said plurality of calculated segment numbers and each of said plurality of calculated segment numbers incrementing by one;

(u) interpolating said plurality of fuel injection quantities from step (j) and developing a control signal therefrom;

(v) driving said plurality of fuel injectors by said control signal; and (w) repeating steps (m)-(v) while the engine continues to operate.

9. A method for controlling a plurality of fuel injectors as defined in claim 8 wherein said plurality of control parameters comprise first and second control parameters.

10. A method for controlling a plurality of fuel injectors as defined in claim 9, wherein said first and second control parameters comprise an engine speed parameter and an intake manifold vacuum parameter.

11. A method for controlling a plurality of fuel injectors as defined in claim 9, wherein said first and second control parameters comprise an engine speed parameter and a throttle valve opening parameter.

12. An engine control device for controlling a plurality of fuel injectors in an engine comprising:

initial sensing means for sensing first and second control parameters which correspond to the engine operating conditions at an initial sensing time;

control map storing means for storing a control map having a plurality of fuel injection quantities which are addressed by first and second memory access parameters corresponding to adjacent ranges of possible values of said control parameters being defined by sequential segment numbers, each of said first and second memory access parameters having segment values within the range of possible values of said control parameters defined thereby;

initializing means for initializing first and second segment numbers at said initial sensing time;

initial control map addressing means for addressing one of said first memory access parameters as defined by said first segment number and addressing one of said second memory access parameters as defined by said second segment number at said initial sensing time;

initial determining means for determining whether said one first memory access parameter is within a predetermined interval of said first control parameter and whether said one second memory access parameter is within a second predetermined interval of said second control parameter at said initial sensing time;

initial segment number changing means for incrementing and decrementing said first and second segment numbers until said one first and one second memory access parameters addressed thereby are within said first and second predetermined intervals of said first and second control parameters respectively;

calculated segment number storing means for storing first and second calculated segment numbers from said initial segment number changing means;

subsequent sensing means for sensing said first and second control parameters which correspond to the engine operating conditions at a subsequent sensing time;

subsequent control map addressing means for addressing one of said first memory access parameters as defined by said first calculated segment number and one of said second memory access parameters as defined by said second calculated segment number at said subsequent sensing time;

subsequent determining means for determining whether said one first memory access parameter is within said first predetermined interval of said first control parameter and determining whether said one second memory access parameter is within said second predetermined interval of said second control parameter at said subsequent sensing time;

subsequent segment number changing means for incrementing or decrementing said first and second calculated segment numbers until said one first and second memory access parameters addressed thereby are within said first and second predetermined intervals of said first and second control parameters respectively;

subsequent segment number storing means for storing first and second subsequently calculated segment numbers from said subsequent segment number changing means;

fuel injection quantity retrieving means for retrieving four of said plurality of fuel injection quantities from said control map as addressed by said first and second memory access parameters, said first and second memory access parameters being defined by combinations of said first and second calculated segment numbers and said first and second calculated segment numbers incremented by one at said initial sensing time or each combination of said first and second subsequently calculated segment numbers and said first and second subsequently calculated segment numbers incremented by one at said subsequent sensing time;

interpolating means for interpolating said four fuel injection quantities by a four point interpolation and developing a control signal therefrom; and driving means for driving said plurality of fuel injectors by said control signal.

13. An engine control device as defined in claim 12, wherein said first and second control parameters comprise an engine speed parameter and an intake manifold vacuum parameter.

14. An engine control device aS defined in claim 12, wherein said first and second control parameters comprise an engine speed parameter and a throttle valve opening parameter.

15. An engine control device as defined in claim 12, wherein said first and second memory access parameters which address said control map comprise values greater than minimum and less than maximum values of said first and second control parameters.

16. An engine control device for controlling a plurality of fuel injectors in an engine comprising:

initial sensing means for sensing a plurality of control parameters which correspond to the engine operating conditions at an initial sensing time;

control map storing means for storing a control map having a plurality of fuel injection quantities which are addressed by a plurality of memory access parameters each of said plurality of memory access parameters corresponding to adjacent ranges of possible values of said plurality of control parameters being defined by a plurality of sequential segment numbers, respectively, each of said plurality of memory access parameters having a segment value within the range of possible values of said plurality of control parameters defined thereby;

initializing means for initializing a plurality of segment numbers which correspond to said plurality of memory access parameters at said initial sensing time;

initial control map addressing means for addressing each of said plurality of memory access parameters as defined by said plurality of segment numbers at said initial sensing time;

initial determining means for determining whether each of said plurality of memory access parameters defined by said plurality of segment numbers are within predetermined intervals of said plurality of control parameters corresponding thereto at said initial sensing time;

initial segment number changing means for incrementing and decrementing said plurality of segment numbers until each of said plurality of memory access parameters addressed thereby are within said predetermined intervals of said plurality of control parameters respectively;

calculated segment number storing means for storing a plurality of calculated segment numbers from said initial segment number changing means;

subsequent sensing means for sensing said plurality of control parameters which correspond to the engine operating conditions at a subsequent sensing time;

subsequent control map addressing means for addressing each of said plurality of memory address parameters as defined by said plurality of calculated segment numbers at said subsequent sensing time;

subsequent determining means for determining whether each of said plurality of memory access parameters defined by said plurality of segment numbers are within said predetermined intervals of said plurality of control parameters at said subsequent sensing time;

subsequent segment number changing means for incrementing and decrementing said plurality of calculated segment numbers until each of said plurality of memory access parameters addressed thereby are within said predetermined intervals of said plurality of control parameters respectively;

subsequent segment number storing means for storing a plurality of subsequently calculated segment numbers from said subsequent segment number changing means;

fuel injection quantity retrieving means for retrieving said plurality of fuel injection quantities from said control map as addressed by said plurality of memory access parameters, said plurality of memory access parameters, said plurality of memory access parameters being defined by combinations of said plurality of calculated segment numbers and said plurality of calculated segment numbers incremented by one at said initial sensing time or combinations of said plurality of subsequently calculated segment numbers and said plurality of subsequently calculated segment numbers incremented by one at said subsequent sensing time;

interpolating means for interpolating said plurality of fuel injection quantities and developing a control signal therefrom; and driving means for driving said plurality of fuel injectors by said control signal.

17. An engine control device as defined in claim 16, wherein said plurality of control parameters comprise first and second control parameters.

18. An engine control device as defined in claim 17, wherein said first and second control parameters comprise an engine speed parameter and an intake manifold vacuum parameter.

19. An engine control device as defined in claim 17, wherein said first and second control parameters comprise an engine speed parameter and a throttle valve opening parameter.

20. An engine control device as defined in claim 17, wherein said first and second memory access parameters which address said control map comprise values greater than minimum values and less than maximum values of said first and second control parameters.

21. A method of controlling a control variable in an engine comprising the steps of:

(a) sensing at least one engine operating condition to develop a sensed value of a control parameter;

(b) storing a control map having a plurality of control variable levels which are addressed by a plurality of memory access parameters, each of said memory access parameters corresponding to adjacent ranges of possible values of said control parameter being defined by sequential segment numbers, each said memory access parameter having a segment value within the range of possible values of said control parameter defined thereby;

(c) selecting an initial memory access parameter defined by a segment number;

(d) comparing the sensed value of said control parameter to said range of values corresponding to said initial memory access parameter defined by said segment number and determining whether said sensed value is greater than, less or within said range of values corresponding to said initial memory access parameter;

(e) selecting said initial number access parameter as a selected memory access parameter to access said control map when said sensed value is within the range of values corresponding to said initial memory access parameter;

(f) updating said memory access parameter by incrementing or decrementing said segment number when said initial memory access parameter is determined in said step (d) to be greater than or less than sad range of values;

(g) repeating said steps (d)–(f) until said step (e) selects said initial memory access parameter as said selected memory access parameter;

(h) accessing one of said control variable levels from said control map by addressing said map with selected memory access parameter; and (i) varying said control to the level selected by said step (h) to control said engine.

22. A system of controlling a control variable in an engine comprising:

sensor means for sensing at least one engine operating condition to develop a sensed value of a control parameter;

memory means for storing a control map having a plurality of control variable levels which are addressed by a plurality of memory access parameters, each of said memory access parameters corresponding to adjacent ranges of possible values of said control parameter being defined by sequential segment numbers, each of said memory access parameters having a segment value within the range of possible values of said control parameter defined thereby;

means for selecting an initial memory access parameter defined by a segment number;

comparator means, responsive to said sensor means and said means for selecting, for comparing the sensed value of said control parameter to said range of values corresponding to said initial memory access parameter defined by said segment number and determining whether said sensed value is greater than, less than, or within said range of values corresponding to said initial memory access parameter;

address determination means, responsive to said comparator means, for selecting said initial memory access parameter as a selected memory access parameter to access said control map when said sensed value is within the range of values corresponding to initial memory access parameter;

means for updating said initial memory access parameter, responsive to said comparator means, by incrementing or decrementing said segment number when said comparator means determines that said initial memory access parameter is greater than or less than said range of values;

said comparetor means, said address determination means and said means for updating operating until said address determination means selects said initial memory access parameter as said selected memory access parameter;

retrieval means accessing one of said control variable levels from said control map in said memory means by addressing said map with said selected memory access parameter; and means for varying said control variable to the level selected by said control map to control said engine.

* * * * *